US011632897B2

(12) United States Patent
Ehlert et al.

(10) Patent No.: US 11,632,897 B2
(45) Date of Patent: Apr. 25, 2023

(54) AGRICULTURAL ASSISTANCE SYSTEM

(71) Applicant: CLAAS Tractor SAS, Vélizy-Villacoublay (FR)

(72) Inventors: Christian Ehlert, Bielefeld (DE); Jan Carsten Wieckhorst, Uelzen Ortsteil Hanstedt (DE); Christian Birkmann, Versmold (DE); Lennart Meyer, Aachen (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 74 days.

(21) Appl. No.: 17/307,805

(22) Filed: May 4, 2021

(65) Prior Publication Data
US 2021/0345537 A1 Nov. 11, 2021

(30) Foreign Application Priority Data

May 6, 2020 (DE) .......................... 102020112299.3

(51) Int. Cl.
*A01B 79/00* (2006.01)
*B60W 10/04* (2006.01)
*B60W 10/30* (2006.01)

(52) U.S. Cl.
CPC .......... *A01B 79/005* (2013.01); *B60W 10/04* (2013.01); *B60W 10/30* (2013.01);
(Continued)

(58) Field of Classification Search
None
See application file for complete search history.

(56) References Cited

U.S. PATENT DOCUMENTS

2014/0343803 A1* 11/2014 Losch ................... G06Q 10/06
701/50
2019/0183031 A1 6/2019 Berger et al.
(Continued)

FOREIGN PATENT DOCUMENTS

DE 102017130146 A1 6/2019
EP 3243367 A2 11/2017
(Continued)

OTHER PUBLICATIONS

European Search Report issued in related application No. EP 21157031.2, dated Jul. 30, 2021 (5 pages).

*Primary Examiner* — Navid Z. Mehdizadeh
(74) *Attorney, Agent, or Firm* — Lempia Summerfield Katz LLC

(57) ABSTRACT

An agricultural assistance system including a driver assistance system for controlling one or both of a prime mover and an attachment of an agricultural combination is disclosed. The agricultural assistance system generates control parameters for one or both of the prime mover and the attachment, has a rule interpreter that generates the control parameters by processing rules from sets of rules, and has a rule generator that provides a plurality of sets of rules. The agricultural assistance system executes the rule interpreter as needed on control hardware that is part of one or both of the prime mover or the attachment, and on control hardware that is disposed remote from the combination. The agricultural assistance system has a coordination module for this which, independent of the site at which the rule interpreter is run, coordinates the rule interpreter with the control generator and the driver assistance system.

20 Claims, 2 Drawing Sheets

(52) U.S. Cl.
CPC ... *B60W 2300/152* (2013.01); *B60W 2555/20* (2020.02); *B60W 2556/45* (2020.02)

(56) References Cited

U.S. PATENT DOCUMENTS

| | | |
|---|---|---|
| 2019/0307068 A1 | 10/2019 | Schroder et al. |
| 2020/0093053 A1 | 3/2020 | Ehlert et al. |
| 2021/0350249 A1 | 11/2021 | Ehlert et al. |

FOREIGN PATENT DOCUMENTS

| | | | |
|---|---|---|---|
| EP | 3243368 | A2 | 11/2017 |
| EP | 3552472 | A1 | 10/2019 |
| EP | 3626041 | A1 | 3/2020 |

\* cited by examiner

AGRICULTURAL ASSISTANCE SYSTEM

CROSS REFERENCE TO RELATED APPLICATION

This application claims priority under 35 U.S.C. § 119 to German Patent Application No. DE 102020112299.3 filed May 6, 2020, the entire disclosure of which is hereby incorporated by reference herein.

TECHNICAL FIELD

The present invention relates to an agricultural assistance system that includes a driver assistance system for controlling a prime mover.

BACKGROUND

US Patent Application Publication No. 2019/0183031 A1, incorporated by reference herein in its entirety, relates to an agricultural assistance system. The agricultural assistance system at issue is used to control a prime mover (e.g., a tractor) and/or an attachment that may form an agricultural combination (e.g., attachment attached to the tractor form the agricultural combination). Thus, the attachment may be coupled to the prime mover. In so doing, one and the same tractor may be combined with a wide variety of attachments. Such attachments may, for example, be mowers, balers, hay rakes, tedders, tillage machines, manure spreaders, etc.

To optimally control the agricultural combination under specific optimization criteria, the prime mover is assigned a driver assistance system. With such a driver assistance system, it is important to be cognizant of certain properties of the prime mover and certain properties of the attachment in order to optimally control the combination.

Control parameters for the prime mover and/or for the attachment may be generated. Further, the driver assistance system has an input/output unit in order to interact with the operator. The generated control parameters may be sent to a machine controller of the prime mover and/or to a device controller of the attachment, if available. A change in the control parameters then causes a corresponding change in the machine settings and/or device settings. The change in the control parameters can be fully automated or be implemented through user input. In the latter case, the user may, for example, be asked by the input/output unit to make corresponding entries.

Driver assistance systems may have a rule-based control. Such rule-based control systems may include a generic rule interpreter that is configured to process or execute the rules in a set of rules. In such a case, the rules may be based on simple "if-then conditions". To process the set of rules, input parameters are fed to the rule interpreter, and the rule interpreter applies the rules of the set of rules to the input parameters. The results are output parameters that result from the input parameters on the one hand and the set of rules on the other hand. The rules of the set of rules are of a standardized format so that entirely unknown rules can be processed by the rule interpreter in a reproducible manner.

The rule interpreter may comprise a generic unit that is designed independently of the design of the prime mover and attachment. The set of rules, in contrast, may be tailored, representing the prime-mover-specific and/or attachment-specific properties.

DESCRIPTION OF THE FIGURES

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
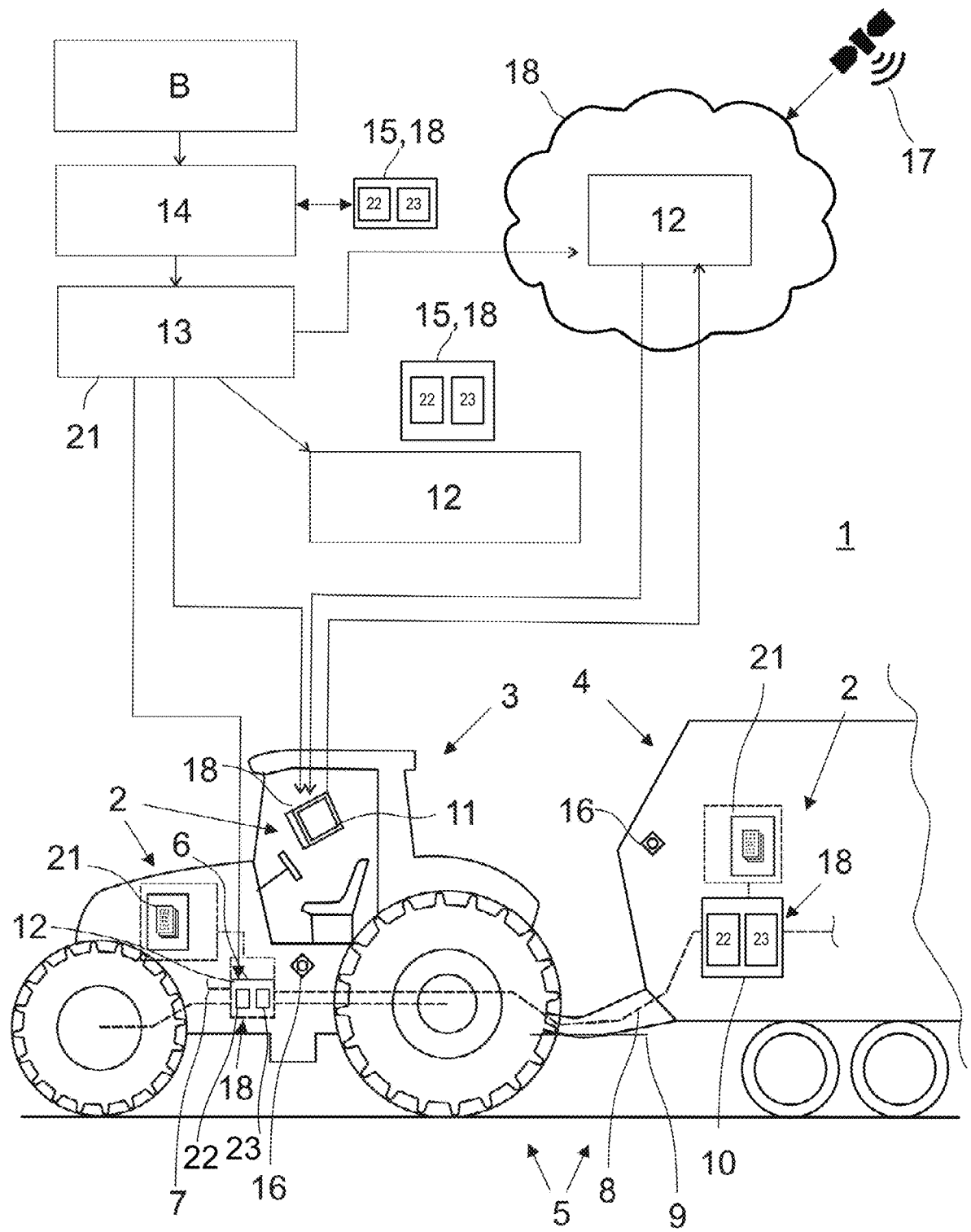
FIG. 1 shows a first schematic representation of a disclosed agricultural assistance system.
Figure 2:
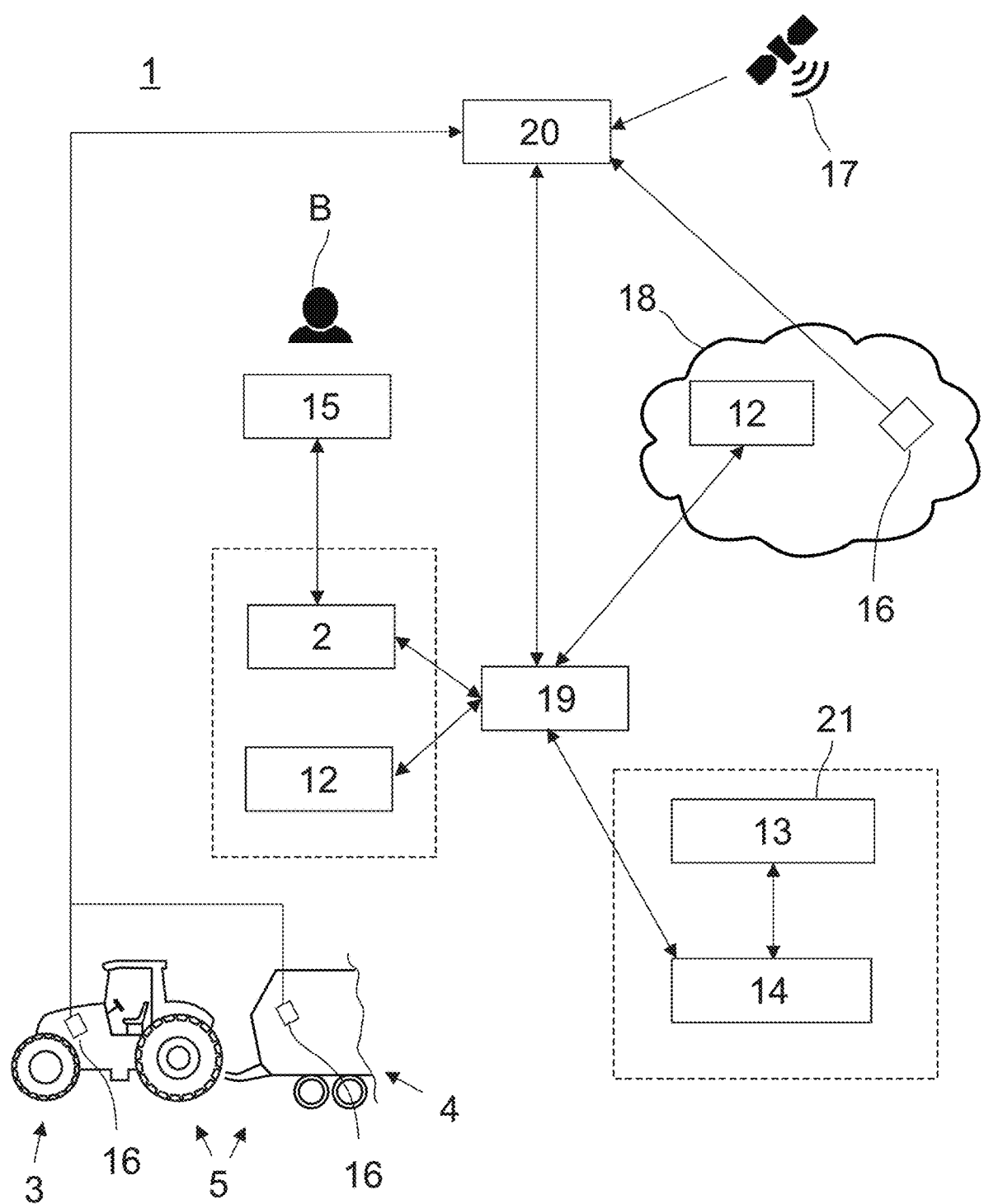
FIG. 2 shows a second schematic representation of a disclosed agricultural assistance system.

As discussed in the background, the rule interpreter may be executed on control hardware of (or associated with) the agricultural combination, or on control hardware remote from the agricultural combination. Further, the sets of rules may be provided by or implemented with a rule generator. This may comprise one or more databases.

One challenge in this regard is that sets of rules and rule interpreters are routinely disposed on different control hardware and may need to be coordinated with each other. However, given storage space restrictions and access limitations to proprietary sets of rules, this coordination may be difficult.

Thus, in one or some embodiments, the disclosed method and system is directed to designing and developing an agricultural assistance system to achieve further improvement or optimization with respect to the aforementioned challenge. The agricultural assistance system may have a driver assistance system for controlling the prime mover (such as a tractor) and/or an attachment of the agricultural combination. The agricultural assistance system is configured to generate control parameters for the prime mover (e.g., control parameters for a machine controller of the prime mover), and/or control parameters for the attachment (e.g., control parameters for a device controller of the attachment). The driver assistance system may further include an input/output unit for dialog with a user (e.g., an operator). The agricultural assistance system also includes has a rule interpreter configured to generate the control parameters by processing rules from one or more sets of rules. Further, the agricultural assistance system includes a rule generator configured to provide a plurality of the one or more sets of rules relating to the prime mover and/or the attachment.

In one or some embodiments, the rule interpreter may be run or executed on one or more different control hardware as needed. The rule interpreter may accordingly be run or executed wherever the corresponding sets of rules are also available. With the assistance of a coordination module, the particular site at which the rule interpreter is run or executed may be independent of the overall functioning of the assistance system. In such an embodiment, the rule generator and the driver assistance system are separate from the rule interpreter so that they function independent of the location and changes in location of the rule interpreter.

In particular, the agricultural assistance system is configured to run the rule interpreter as needed on control hardware that is part of the prime mover and/or of the attachment, and on control hardware that is disposed remote from the combination, and that the agricultural assistance system includes a coordination module for this which, independent of the site at which the rule interpreter is run, is configured to coordinate the rule interpreter with the rule generator and the driver assistance system.

Thus, the coordination module is configured to coordinate communication between the rule interpreter and other modules (such as one or both of the input module (in order to obtain sensor data, weather data, or machine data from one or both of the prime mover or the attachment) or the input/output unit (in order to obtain user entries based on one or more queries)) in order for the rule interpreter to receive information from the one or more modules physically remote from the rule interpreter. In this way, the rule interpreter may generate, based on the information received using the coordination module, the one or more control parameters. In this regard, the module(s) may provide input to the rule interpreter so that the rule generator and the driver assistance system, physically separate from the rule interpreter, function independently of location and changes in the location of the rule interpreter.

Referring to the figures, FIG. 1 shows a schematic representation of an agricultural combination with the disclosed agricultural assistance system 1. The agricultural assistance system 1 has a driver assistance system 2. In one or some embodiments, the driver assistance system 2 is configured to control a prime mover 3, such as a tractor, and/or an attachment 4 of an agricultural combination 5.

The attachment 4 may be any type of attachment that may be coupled to a prime mover 3. In the disclosed embodiment, the attachment 4 is a baler with which hay, straw, etc. can be pressed into bales. Other attachments are contemplated.

The prime mover 3 includes a machine controller 6 with which machine settings such as any one, any combination, or all of the rotational speed of the prime mover motor 7, the rotational speed or the torque of the power takeoff shaft 8 of the prime mover 3, the lift height of a rear power lift 9, etc. may be changed. In one or some embodiments, the machine controller 6 is supplied the control parameters generated by the agricultural assistance system 1.

The machine controller 6 may comprise any type of computing functionality, such as at least one processor 22 (which may comprise a microprocessor, controller, PLA, or the like) and at least one memory 23. The one or more memories may comprise any type of storage device (e.g., any type of memory). Though the processor 22 and memory 23 are depicted as separate elements, they may be part of a single machine, which includes a microprocessor (or other type of controller) and a memory.

The processor 22 and memory 23 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the attachment 4 is also equipped with its own control functionality, such as device controller 10 that is fed one or more control parameters generated by the agricultural assistance system 1. Similar to machine controller 6, device controller 10 may include at least one processor 22 and at least one memory 23. In one embodiment, the computing functionality for machine controller 6 is identical to device controller 10. Alternatively, the computing functionality for machine controller 6 is different from device controller 10. This supplying of the control parameters to the device controller 10 may be performed automatically or responsive to input by an user B (e.g., the operator may release the change of control parameters through an input/output unit 11, or enters them through the input/output unit 11).

The figures illustrate an agricultural assistance system 1 having a driver assistance system 2 for controlling a prime mover 3, such as a tractor, and/or an attachment 4 of an agricultural combination 5, wherein the agricultural assistance system 1 generates control parameters for one or both of the prime mover 3 (such as for machine controller 6 of the prime mover 3), and/or for the attachment 4 (such as for a device controller 10 of the attachment 4). The driver assistance system 2 has an input/output unit 11 for the dialog with a user B, wherein the agricultural assistance system 1 includes a rule interpreter 12 that generates the control parameters by processing rules from one or more sets of rules 13. Further, in one or some embodiments, the agricultural assistance system 1 includes a rule generator 14 that is configured to provide a plurality of one or more sets of rules 13 relating to the prime mover 3 and/or the attachment 4.

In one or some embodiments, the term "rule generator" is to be understood broadly in this context. In a specific embodiment, the rule generator is configured to provide the one or more sets of rules 13 only from a memory, as discussed further below.

The input/output unit 11 may be arranged or positioned on the prime mover 3. Alternatively, or in addition, the input/output unit 11 may be formed by or positioned on a mobile device 15. The driver assistance system 2 is, as shown, may be arranged or positioned on the agricultural combination 5, such as on the prime mover 3.

The rule interpreter 12 is configured to generate the control parameters from the one or more sets of rules 13 that may contain a variety of different rules. The one or more sets of rules 13 may affect or control the prime mover 3, the attachment 4 and/or the agricultural combination 5. Merely by way of example, the sets of rules may cover or be directed to different input data comprising (or consisting of) sensors 16 and data sources 17 (such as external data sources) and have different complexities. It is furthermore conceivable that the data sources 17 are provided by a mobile terminal, in particular, by a smart device such as a smartphone. All this also relates, in principle, to the data processing hardware assigned to the rule interpreter 12 and the input/output unit. The one or more sets of rules 13 are provided by the rule generator 14, which may comprise at least one database. In one or some embodiments, the rule generator 14 is a web-based server platform on which the one or more sets of rules 13 may be created by different users B. In one or some embodiments, the agricultural assistance system includes a server platform, with the server platform running the rule generator 14. The server platform may be used by a user assigned to the agricultural combination. For example, the user, via a browser, may create and/or edit the one or more sets of rules. The server platform may provide a web interface as a user interface for the rule generator 14. For example, the web interface may display flowcharts on the one or more sets of rules. Alternatively, or in addition, the server platform may comprise a database which may have stored therein text components for dialogs assigned to the one or more sets of rules that may be used by the user to create or edit the dialog. Alternatively, or in addition, the server platform may include a preview function for the assigned dialogs. Thus, For the purposes of the disclosed agricultural assistance system 1, the one or more sets of rules 13 may, under certain circumstances, also already have been created by a respective user B and are only provided.

The agricultural assistance system 1 may include a rule generator 14 for creating and/or editing the one or more sets of rules 13. In one or some embodiments, in order to create and/or edit the one or more sets of rules 13, the rule generator 14 generates a user interface through which the one or more sets of rules 13 may be created and/or edited by one or more users. For example, the user interface may comprise a browser through which creating and/or editing of the one or more rules may be accomplished. Further, the rule generator 14 may include user administration functionality in which access rights of individual users B (as defined by an indication of access rights) to at least part of the set the rules 13 are defined (e.g., the rule generator 14 may determine whether a specific user B has permission to create and/or edit the one or more rules via the user administration functionality).

In one or some embodiments, the rule generator 14 may be configured to create and/or edit the one or more sets of rules 13 and include functionality to transmit them to the rule interpreter 12. In one or some embodiments, the user interface may comprise a website that may be accessed via a typical Internet browser. In one or some embodiments, the rule generator 14, using its user administration functionality, may regulate access by a particular user B to the one or more sets of rules 13 (e.g., access to the website may be determined by the user administration functionality of the rule generator 14 so that the particular user B may be given access to the website to create and/or edit the one or more sets of rules 13 responsive to the user administration functionality determining access should be granted).

In one or some embodiments, the user B may create and/or edit his/her own and/or common sets of rules 13. In a more specific embodiment, the users B may log on, for example, to the rule generator 14 with a password and a username through the user interface. Responsive to the rule generator 14 granting access (based on the password and username entered), the users B may then edit the one or more sets of rules 13 that the users B are entitled to access and create additional sets of rules 13. For example, a database may have stored therein identification for a particular user B, such as in the form of his/her username/password, correlated with the specific set(s) of rules 13 that the particular user B is entitled to access/edit and/or specific actions that the particular user B may perform, including creating and/or editing. In practice, the user may enter his/her username/password or other type of user information. The rule generator 14 may compare the username/password stored in the database with that provided by the user. If there is a match, the rule generator 14 generate, via the input/output unit, a user interface (such as a browser interface) through which the user may enter rules information in order to perform one or both of creating or editing the one or more sets of rules. Responsive to receiving the rules information (entered via the browser interface), the rule generator 14 may perform one or both of creating or editing the one or more sets of rules.

In one or some embodiments, the particular user B may set access rights to part or all of his/her sets of rules 13, with the access rights indicating to the rule generator 14 whether to enable one or more other users access to edit and/or deny others access to edit. In one or some embodiments, the particular user B may indicate to the rule generator 14 whether some or all of the one or more sets of rules associated with the particular user B may be published or sold (e.g., in one embodiment, the particular user B may initially indicate that the one or more sets of rules associated with the particular user B may published or sold; after which, the one or more sets of rules associated with the particular user B may be published or sold without further input from the particular user B; alternatively, the rule generator 14 may contact the particular user B to request approval from the particular user B prior to publishing or selling part or all of the one or more sets of rules associated with the particular user B, such as allowing another user access in order to edit the one or more sets of rules). In this regard, the rule generator 14 may assist in publishing and/or selling the one or more sets of rules 13. By this type of cooperation, it is made possible for the users B to optimize their agricultural combination 5 based on the knowledge of many other users B. In one or some embodiments, the access rights (such as the settings enabling access, publication, and/or sale) are saved in a database.

In one or some embodiments, the one or more sets of rules 13 are transmitted by the rule generator 14 to the rule interpreter 12, such that the one or more sets of rules 13 are processed by the rule interpreter 12 in a dialog with a user B. In particular, the dialog, which may comprise the user interface through which the user B may interact with the rule interpreter 12, enables the user B to create and/or edit the one or more sets of rules 13.

In one or some embodiments, a dialog with the user B comprises the displaying of information to the user B including any one, any combination, or all of a question, a selection option, an input option, etc. in response to which, the user B may provide or offer a standardized response. The response of the user B may then be used by the rule interpreter 12 in the context of processing the one or more sets of rules 13. In one or some embodiments, the dialog comprises several such user entries. The rule interpreter 12 may comprise a generic unit which may be executed independently of location on basically any type of control hardware. In this regard, in one or some embodiments, several rule interpreters 12 may be present in different locations. Thus, a sole rule generator 14 may be resident in a central location (so that the agricultural assistance system consists of a single rule generator 14), such as the server platform, whereas the rule interpreters 12 may be decentralized (and may reside in several different locations, such as several different geographic locations so that the plurality of rule interpreters 12 are resident in a plurality of prime movers, a plurality of attachments, or in a plurality of agricultural combinations of prime movers and tractors).

Moreover, in one or some embodiments, a first group of users B may be granted access to the one or more sets of rules 13 created by second group of users B (e.g., the second group of users B may indicate that the first group of users B may be granted access or may indicate that any user may be granted access). In turn, the first group of users B may transmit agricultural combinations 5 assigned to them from the rule generator 14 to the rule interpreter 12, so that the first group of users B may edit the one or more sets of rules 13 created by the second group of users B, and/or that agricultural combinations 5 are also assigned to the second group of users B, and/or that a user B may release one or more sets of rules 13 for other users B (through the user administration functionality) that he/she may have created or edited.

The assignment of the agricultural combinations 5 to the users B may relate to an ownership status. However, it may also constitute a usage or another assignment. In one or some embodiments, the assignment is saved in a database of the agricultural assistance system 1 and defined in this regard. In one or some embodiments, higher level assignments may also be provided, for example through cooperations between users B. In such a case, these assignments are all defined in the database of the agricultural assistance system 1 and may also only be relevant to the user administration within the defined framework. The user B may, accordingly, for example control his agricultural combinations 5 with sets of rules 13 from other users B.

To accomplish this, the rule generator 14 may provide the one or more sets of rules 13 as needed to the rule interpreter 12, such as independent of the location at which it is run.

Moreover, in such a case, it is provided that the agricultural assistance system 1 has a server platform. In particular, the server platform may run the rule generator 14, and with the server platform being used by a user B assigned to the agricultural combination 5 (e.g., based on a browser, the user B may create and/or edit the one or more sets the rules 13).

The server platform may comprise at least hardware and computing capacity for running the rule generator 14. Similar to machine controller 6 and device controller 10, the server platform may comprise at least one processor 22 and at least one memory 23. In this regard, any discussion regarding machine controller 6 or device controller 10 may be applied to server platform.

In one or some embodiments, the server platform is configured to provide a web interface as a user interface for the rule generator 14 (e.g., flowcharts on the sets of rules 13 can be displayed via the web interface), and/or that the server platform comprises a database which may include text components for dialogs assigned to the one or more sets of rules 13 that may be used by the user B to create and/or edit the dialog, and/or that the server platform has a preview function for the assigned dialogs.

In one or some embodiments, the web interface comprises a website with access to a database on the server platform. In this case, the one or more sets of rules 13 and the dialogs may be edited and/or created to a great extent. In so doing, any one, any combination, or all of the following can be provided: drag-and-drop functionalities; encoding options; options for saving; downloading; duplicating; referencing and publishing; or preview functions.

In one or some embodiments, the agricultural assistance system 1 is configured to run or execute the rule interpreter 12 as needed on control hardware 18 that is part of the prime mover 3 and/or the attachment 4, and on control hardware 18 that is disposed remote (such as geographically remote) from the combination, and that the agricultural assistance system 1 includes a coordination module 19 for this which, independent of the site at which the rule interpreter 12 is run or executed, coordinates the rule interpreter 12 with one or both of the rule generator 14 and the driver assistance system 2.

In this instance, the rule interpreter 12 may basically be executed on a variety of control hardware, such as any control hardware 18. In such an instance, the control hardware 18 may be changed at any time or modified in at least one aspect in that the rule interpreter 12 is moved, or a different rule interpreter 12 is started without the driver assistance system 2 or the rule generator 14 having been influenced thereby. In this case, the location at which the rule interpreter 12 is run or executed may be unknown to the driver assistance system 2. In this instance, the coordination module 19 is configured to select the location at which the rule generator 14 is run or executed as needed and depending on the set of rules 13 to be processed. "Dialog" is to be understood to mean, more generally, that the input/output unit is suited, on the one hand, for the input of information by the user and for the output of information to the user. The term "dialog" may correspondingly refer to this communication with the user B. A dialog may contain at least one piece of the information, such as a question or selection option, that is displayed to the user B. Responsive to the dialog issuing the question and/or the selection option, the user may input user input, such as a selection or an answer to the question, which in turn may be reported to the rule interpreter 12.

The embodiment illustrated in the figures may further provide that the rule interpreter 12 takes into account or considers user input, such as user entries that are entered as part of the dialog, when processing or selecting the set of rules 13. In particular, the rule interpreter 12 may communicate queries for a user B to the coordination module 19. In turn, the driver assistance system 2 may present the queries to the user B soliciting an answer. Responsive to presenting the queries, the user B may provide an answer, such as in the form of one or more user entries, with the user entries then being communicated to the rule interpreter 12 via the coordination module 19 (e.g., the one or more user entries are communication from the electronic device associated with the user, such as a mobile device, to the coordination module 19 (which may be at a central server); in turn, the coordination module 19 transmits the one or more user entries to the rule interpreter 12). In this regard, the coordination module may act as an intermediary between the rule interpreter 12 and the user B, with one or both of the electronic device executing the rule interpreter 12 or the electronic device associated with the user not knowing the communication address of the other, instead knowing the communication address of the electronic device executing the coordination module 19. Responsive to receiving the one or more user entries, the rule interpreter 12 may generate the control parameters based on the one or more sets of rules 13 and based on the user entries.

The rule interpreter 12 receives input parameters 22-24 from a data source 25-27, in this case and preferably from different data sources 25-27, wherein the rule interpreter 12 applies the rules 13 a of the set of rules 13 to be executed to the received input parameters 25-27 in order to generate the aforementioned control parameters 5 *a*, 5 *b*.

With respect to the input parameters which can be entered, for example, via the input/output unit 11, it is also to be pointed out that the input parameters can also be optimization criteria which have been predefined by the user, wherein the rule interpreter 12 executes the rules 13 a of the set of rules 13 to be executed with the objective of meeting the optimization criteria. Basically, the focus of the optimization can therefore be varied by way of the input parameters for the rule interpreter 12.

Of interest with respect to the approach according to the invention is the fact that not only can the sets of rules 15-17 and the input parameters 22-24 originate from entirely different data sources, but also that the rule interpreter 12, the linking module 14, and the input/output unit 11 can be implemented in nearly any way. In one first alternative, at least one of these components can run on a piece of control hardware which is fixedly installed on the towing vehicle or on the mounted device. Alternatively, it can be provided that at least one of these components runs on a piece of control hardware which is remote from the combination of vehicles, in particular, is remote from the towing vehicle and/or is remote from the mounted device.

As mentioned above, the rule interpreter applies the rules of the set of rules, which are to be executed, to input parameters. According thereto, the input parameters can also originate from different data sources, for example, from a sensor system of the towing vehicle and/or from the mounted device, from the input/output unit of the driver assistance system, or from a data source remote from the combination of vehicles.

Accordingly, the rule interpreter 12 may communicate with the user B one or several times based on the one or more sets of rules 13 independent of the location at which the rule interpreter 12 is run.

Moreover, in such a case, the agricultural assistance system 1 may include an additional rule interpreter 12 (e.g., the agricultural assistance system includes a plurality of rule interpreters including at least a first rule interpreter executed on one or both of the machine controller on the prime mover or the device controller on the attachment and at least a second rule interpreter executed on the control hardware remote from the agricultural combination). The coordination module 19 may coordinate or sync one or more aspects of the additional rule interpreter 12 with the rule generator 14 and the driver assistance system 2 (e.g., manage communications with the first rule interpreter and the second rule interpreter, such as coordinate both the first rule interpreter and the second rule interpreter with the rule generator and the driver assistance system). In practice, the agricultural assistance system 1 may execute at least one rule interpreter 12 on control hardware 18 of the agricultural combination 5 (such as prime mover 3), and the agricultural assistance system 1 may execute at least one rule interpreter 12 on control hardware 18 remote from the combination, such that multiple rule interpreters 12 communicate (such as communicate sequentially) with the user B based on a dialog via the coordination module 19 and receive user entries (e.g., a first rule interpreter resident on and executed by control hardware 18 on the agricultural combination 5 may communicate (e.g., present questions) to the user B via coordination module 19 (e.g., coordination module 19 acting as facilitator, such as by routing, so that the user B communicates with the first rule interpreter) and a second rule interpreter resident on and executed by control hardware 18 remote from the agricultural combination 5 may communicate to the user B via coordination module 19). Thus, in one or some embodiments, the coordination module may control communications such that the plurality of rule interpreters communicates sequentially with the user based on the dialog in order to receive user entries. Alternatively, or in addition, the coordination module may coordinate communications between the plurality of rule interpreters with the input module so that the plurality of rule interpreters may obtain the information needed, thereby processing the sets of rules based on the input data to generate the one or more control parameters.

In one or some embodiments, a set of rules 13, which is assigned to the prime mover 3, may be saved on control hardware 18 of the prime mover 3. Thus, the rule interpreter 12, resident on control hardware 18 of the prime mover 3, may be executed in order to process this set of rules 13 that is saved on control hardware 18 of the prime mover 3. Another set of rules 13, such as for optimizing the agricultural combination 5, may be resident on control hardware 18 remote from the combination. In such a case, the computing power and/or storage capacity of the control hardware 18 remote from the combination is greater than the computing power and/or storage capacity of the agricultural combination 5. Alternatively, or in addition, the set of rules 13 contains data which should not be distributed or disseminated. In such an instance, the rule interpreter 12 is therefore run locally, such as executed at the location where the set of rules 13 is stored. It is pointed out that the computing power and the amount of memory to be kept available locally in the towing vehicle and in the mounted device are comparatively small in the approach according to the invention. The reason therefore is that, due to the rules-based implementation of the driver assistance system 2, an execution of standardized rules by the rule interpreter 12 is provided, and so compute-intensive and memory-intensive special software can be dispensed with. The driver assistance system 2 according to the invention is equipped with an aforementioned rule interpreter 12 which generates the control parameters for the combination of vehicles by executing the rules of a set of rules. In this case, the rule interpreter 12 is a generic unit which is designed independently of the design of the towing vehicle and the mounted device. The set of rules, however, represents the towing vehicle-specific and/or mounted device-specific properties.

Moreover, in one or some embodiments, the agricultural assistance system 1 includes an input module 20 that compiles input data, such as sensor data, which may be obtained from one or more sources, such as from any one, any combination, or all of from the prime mover 3, the attachment 4, or a data source 17 remote from the agricultural combination. The particular rule interpreter 12 may process one or more sets of rules 13 based on the input data, and the coordination module 19 may coordinate the particular rule interpreter 12 with the input module 20.

In addition to sensor data from the sensors 16, the input data may also comprise any one or both of weather data or machine data from one or both of the prime mover 3 or the attachment 4, or the like. The input module 20 may therefore also be coordinated with the rule interpreter 12. As one example, the input data may be generated and transmitted to the coordination module 19. Responsive to the particular rule interpreter 12 requesting the input data (e.g., the particular rule interpreter 12 executing the one or more sets of rules 13 identifies that input data is needed for execution of the one or more sets of rules 13), the coordination module 19 may transmit the input data to the particular rule interpreter 12. As another example, responsive to the particular rule interpreter 12 executing the one or more sets of rules 13 identifies that input data is needed for execution of the one or more sets of rules 13, the particular rule interpreter 12 may send a communication to the coordination module 19 requesting the input data. In turn, the coordination module 19 may communicate with an electronic device executing the input module 20. Responsive to the communication, the electronic device executing the input module 20 may transmit the input data to the coordination module 19, which in turn relays the input data to the particular rule interpreter 12.

Moreover, in one or some embodiments, the rule generator 14 includes (or has access to) a database 21 with one or more sets of rules 13, and/or that the rule generator 14 is configured to create and/or edit the one or more sets of rules 13. In one or some embodiments, the one or more sets of rules 13 may be created and/or edited by several users B using the rule generator 14, such as based on a browser. See, for example, U.S. application Ser. No. 17/307,615, incorporated by reference herein in its entirety. The rule generator 14 may provide or generate a user interface through which the one or more sets of rules may be created and/or edited by one or more users. One example user interface may be based on a browser. The rule generator 14 may further have a user administration function in which access rights of individual users (such as an indication that indicates the access rights) to at least part of the set the rules may be defined. In one or some embodiments, the rule generator may transmit the one or more sets of rules to the rule interpreter, so that the rule interpreter may process the one or more sets of rules via a dialog (e.g., communication or interaction) with a user. In particular, a set of rules may be created and/or edited by the user via the rule generator through the user interacting via the user interface.

In particular, the database 21 need not be a uniform database 21 but rather may, as shown, comprises several databases 21. In the simplest instance, the rule generator 14 may only comprise this database 21. In this case, the rule generator 14 may, however, be based on an Internet platform that is used by several users B to create and/or edit sets of rules 13.

Moreover, in one or some embodiments, the agricultural assistance system 1 executes any one, any combination, or all of the input module 20, the coordination module 19, or the rule generator 14 at least partially, such as completely, on any one, any combination, or all of: on control hardware 18 that is part of the prime mover 3 and/or the attachment 4; on control hardware 18 that is disposed remote from the agricultural combination; or that the agricultural assistance system 1 runs the driver assistance system 2 at least partially on control hardware 18 that is part of the prime mover 3 and/or the attachment 4 (and a remaining part on other control hardware, such as control hardware 18 that is disposed remote from the agricultural combination).

In one or some embodiments, the control hardware 18 remote from the agricultural combination may comprise a smart device remote from the combination, such as any one, any combination, or all of a smart phone, a tablet computer, a laptop, or a server. The control hardware 18 of the agricultural combination 5 may comprise a user terminal of the prime mover 3, and/or the attachment 4, and or an ISOBUS-based user terminal. A rule interpreter 12 may be run entirely or partially on all of this control hardware 18. In one or some embodiments, the coordination module 19 ensures a smooth process in the coordination of the different components of the agricultural assistance system 1.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural assistance system
2 Driver assistance system
3 Prime mover
4 Attachment
5 Agricultural combination
6 Machine controller
7 Prime mover motor
8 Power take-off shaft
9 Rear power lifter
10 Device controller
11 Input/output unit
12 Rule interpreter
13 List of rules
14 Rule generator
15 Mobile device
16 Sensors
17 External sources
18 Control hardware
19 Coordination module
20 Input module
21 Database
22 Processor
23 Memory
B User

The invention claimed is:

1. An agricultural assistance system comprising:
a driver assistance system configured to control one or both of a prime mover designed as a tractor or an attachment of an agricultural combination, the driver assistance system having an input/output unit for input of information by a user and output of information to the user;
wherein the agricultural assistance system is configured to generate control parameters for one or both of a machine controller of the prime mover or a device controller of the attachment;
a rule generator executed by at least one processor and configured to provide a plurality of sets of rules relating to one or both of the prime mover or the attachment; and
a rule interpreter executed by the at least one processor and configured to generate the control parameters by processing rules from at least one of the plurality of sets of rules;
wherein the agricultural assistance system is configured to run the rule interpreter as needed on local control hardware that is part of one or both of the prime mover or the attachment, and on remote control hardware that is disposed remote from the agricultural combination; and
wherein the agricultural assistance system has a coordination module which, independent of a site at which the rule interpreter is run, is configured to coordinate the rule interpreter with the rule generator and the driver assistance system.

2. The agricultural assistance system of claim 1, wherein the rule interpreter is configured to take into account user entries based on the information input by the user when processing or selecting the at least one of the plurality of sets of rules;
wherein the rule interpreter is configured to communicate queries for the user to the coordination module;
wherein the coordination module is configured to communicate the queries to the driver assistance system;
wherein the driver assistance system is configured to specify the queries to the user to be answered by the user entries;
wherein the coordination module is configured to communicate the user entries to the rule interpreter; and
wherein the rule interpreter is configured to generate the control parameters based on the at least one of the plurality of sets of rules and the user entries.

3. The agricultural assistance system of claim 1, wherein the agricultural assistance system has an additional rule interpreter;
wherein the coordination module is configured to coordinate the additional rule interpreter with the rule generator and the driver assistance system.

4. The agricultural assistance system of claim 3, wherein the agricultural assistance system is configured to execute at least one rule interpreter on the local control hardware of the agricultural combination.

5. The agricultural assistance system of claim 4, wherein the prime mover and the agricultural assistance system are configured to run the at least one rule interpreter on the remote control hardware remote from the agricultural combination.

6. The agricultural assistance system of claim 5, wherein the rule interpreter and the additional rule interpreter are configured to communicate sequentially with the user based on at least one of the information input by the user or the information output to the user via the coordination module and to receive user entries.

7. The agricultural assistance system of claim 1, wherein the agricultural assistance system has an input module that compiles input data from one or more of the prime mover, the attachment, or a data source remote from the agricultural combination;
   wherein a particular rule interpreter is configured to process the at least one of the plurality of sets of rules based on the input data; and
   wherein the coordination module is configured to coordinate the particular rule interpreter with the input module.

8. The agricultural assistance system of claim 1, wherein one or both of the rule generator has a database with the plurality of the sets of rules or the rule generator is configured to perform one or both of create or edit the plurality of the sets of rules; and
   wherein the plurality of the sets of rules are one or both of created or edited by several users using the rule generator based on a browser.

9. The agricultural assistance system of claim 1, wherein the agricultural assistance system is configured to execute one or more of an input module, the coordination module, the rule generator at least partially on one or more of:
   the local control hardware that is part of one or both of the prime mover or the attachment; or
   the remote control hardware that is disposed remote from the agricultural combination.

10. The agricultural assistance system of claim 9, wherein the agricultural assistance system is configured to execute the driver assistance system completely on the local control hardware that is part of one or both of the prime mover or the attachment.

11. The agricultural assistance system of claim 1, wherein the agricultural assistance system includes a plurality of rule interpreters including at least a first rule interpreter executed on one or both of the machine controller on the prime mover or the device controller on the attachment and at least a second rule interpreter executed on the remote control hardware remote from the agricultural combination; and
   wherein the coordination module is configured to manage communications with the first rule interpreter and the second rule interpreter.

12. The agricultural assistance system of claim 11, wherein the coordination module is configured to coordinate both the first rule interpreter and the second rule interpreter with the rule generator and the driver assistance system.

13. The agricultural assistance system of claim 11, wherein the coordination module is configured to control communications of one or more users with both the first rule interpreter and the second rule interpreter.

14. The agricultural assistance system of claim 13, wherein the coordination module is configured to control communication of the users with both the first rule interpreter and the second rule interpreter such that the first rule interpreter and the second rule interpreter communicate sequentially with the user.

15. The agricultural assistance system of claim 14, wherein the driver assistance system includes the input/output unit for communication with the user; and
   wherein the coordination module is configured to control communications such that the plurality of rule interpreters communicates sequentially with the user based on the communication in order to receive user entries.

16. The agricultural assistance system of claim 14, wherein the agricultural assistance system includes an input module configured to compile input data;
   wherein the plurality of rule interpreters are configured to process the at least one of the plurality of sets of rules based on the input data; and
   wherein the coordination module is configured to coordinate communications between the plurality of rule interpreters with the input module.

17. The agricultural assistance system of claim 1, further comprising an input module configured to obtain input data, the input module is configured for execution on one or both of the machine controller on the prime mover or the device controller on the attachment;
   wherein the driver assistance system is configured for execution on one or both of the machine controller on the prime mover or the device controller on the attachment;
   wherein the coordination module is configured for execution on a central server; and
   wherein the rule interpreter is configured for execution on the remote control hardware remote from the agricultural combination.

18. The agricultural assistance system of claim 1, wherein a location at which the rule interpreter is executed is unknown to the driver assistance system; and
   wherein coordination module is configured to select the location at which the rule generator is executed as needed and depending on the set of rules to be processed.

19. The agricultural assistance system of claim 1, wherein the rule generator and the driver assistance system are separate from the rule interpreter so that the rule generator and the driver assistance system function independent of location and changes in the location at which the rule interpreter is executed.

20. The agricultural assistance system of claim 19, wherein the rule interpreter is configured to communicate, via the coordination module, with the user via the input/output unit of the driver assistance system independent of the location at which the rule interpreter is executed.

* * * * *